United States Patent
Srugis et al.

(10) Patent No.: US 8,851,522 B1
(45) Date of Patent: Oct. 7, 2014

(54) SEATBELT ANCHOR ASSEMBLY

(71) Applicant: Autoliv ASP, Inc., Ogden, UT (US)

(72) Inventors: David Srugis, Oxford, MI (US);
Thomas Garvey, Waterford, MI (US);
Nick Paglia, Shelby Township, MI (US);
David Dziuda, Rochester, MI (US);
Scott Bellman, Lake Orion, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/828,606

(22) Filed: Mar. 14, 2013

(51) Int. Cl.
- *B60R 22/18* (2006.01)
- *B60R 22/28* (2006.01)
- *B60R 22/22* (2006.01)
- *F16C 33/04* (2006.01)

(52) U.S. Cl.
CPC ................. *B60R 22/22* (2013.01); *F16C 33/04* (2013.01)
USPC ........ 280/801.1; 188/371; 280/805; 297/468; 297/472

(58) Field of Classification Search
CPC ........ B60R 22/18; B60R 22/26; B60R 22/28; B60R 22/32; B60R 22/324; B60R 21/055; B60R 2022/18; B60R 2022/1806; B60R 2022/26; B60R 2022/28; B60R 2022/281; B60R 2022/32; F16F 7/14; F16F 7/128; A44B 11/2569
USPC .............. 24/633, 637, 643, 647; 29/509, 513, 29/515, 517; 180/274, 281; 188/371, 376; 280/801.1, 801.2, 805; 297/468, 297/470–472, 482; 403/282, 284
See application file for complete search history.

(56) References Cited

U.S. PATENT DOCUMENTS

| | | | |
|---|---|---|---|
| 2,806,215 A * | 9/1957 | Redslob | 439/868 |
| 2,815,497 A * | 12/1957 | Redslob | 439/203 |
| RE24,510 E * | 8/1958 | Macy | 439/877 |
| 3,106,989 A * | 10/1963 | Fuchs | 188/375 |
| 3,427,694 A | 2/1969 | Bullock | |
| 3,438,674 A * | 4/1969 | Booth et al. | 297/472 |
| 3,446,533 A * | 5/1969 | Booth et al. | 297/472 |
| 3,806,999 A | 4/1974 | Fieni | |
| 3,938,627 A * | 2/1976 | Nagazumi | 188/371 |
| 3,973,650 A * | 8/1976 | Nagazumi | 188/371 |

(Continued)

FOREIGN PATENT DOCUMENTS

| | | | | |
|---|---|---|---|---|
| DE | 42 14 600 A1 | 11/1992 | | |
| EP | 88489 A1 * | 9/1983 | ............. | F16G 11/00 |
| JP | 2009006776 A * | 1/2009 | | |
| JP | 2010260368 A * | 11/2010 | | |

*Primary Examiner* — Paul N Dickson
*Assistant Examiner* — Laura Freedman
(74) *Attorney, Agent, or Firm* — Brinks Gilson & Lione

(57) ABSTRACT

A seatbelt anchor assembly includes a ferrule, a cable, and seatbelt buckle. The ferrule can be mounted at one end to a seat base or other mounted structure of the vehicle, and can further include an anti-rotation pin that is received in a locating hole of the seat base to limit rotation of the ferrule during mounting and during normal occupant use. The pin can be made from aluminum or other material that can shear off in response to a dynamic vehicle load, allowing the ferrule to pivot about its mounting location to align the loads. The ferrule can be in the form of a blank including a body portion and a head portion having a pair of ears, and can include a recess between the ear portions and the body portion to limit tension in the ferrule when the ferrule is crimped to mount a cable thereto.

20 Claims, 3 Drawing Sheets

(56) References Cited

U.S. PATENT DOCUMENTS

| | | | |
|---|---|---|---|
| 4,373,830 A * | 2/1983 | Ikesue | 403/284 |
| 4,575,118 A | 3/1986 | Matsui et al. | |
| 4,611,854 A | 9/1986 | Pfeiffer | |
| 4,729,602 A * | 3/1988 | Tokugawa | 297/468 |
| 5,064,220 A * | 11/1991 | Ogawa | 280/801.1 |
| 5,104,193 A * | 4/1992 | Fohl | 297/480 |
| 5,188,425 A | 2/1993 | Foster et al. | |
| 5,531,479 A * | 7/1996 | Bauer | 280/806 |
| 5,671,948 A | 9/1997 | Susko et al. | |
| 6,209,915 B1 * | 4/2001 | Blakesley | 280/801.1 |
| 6,615,461 B2 | 9/2003 | Suyama | |
| 7,007,976 B2 * | 3/2006 | Ante et al. | 280/801.1 |
| 7,445,244 B2 | 11/2008 | Taylor | |
| 7,584,998 B2 * | 9/2009 | Richter et al. | 280/801.1 |
| 7,878,547 B2 | 2/2011 | Dusina et al. | |
| 2007/0138782 A1 | 6/2007 | Murthy et al. | |

* cited by examiner

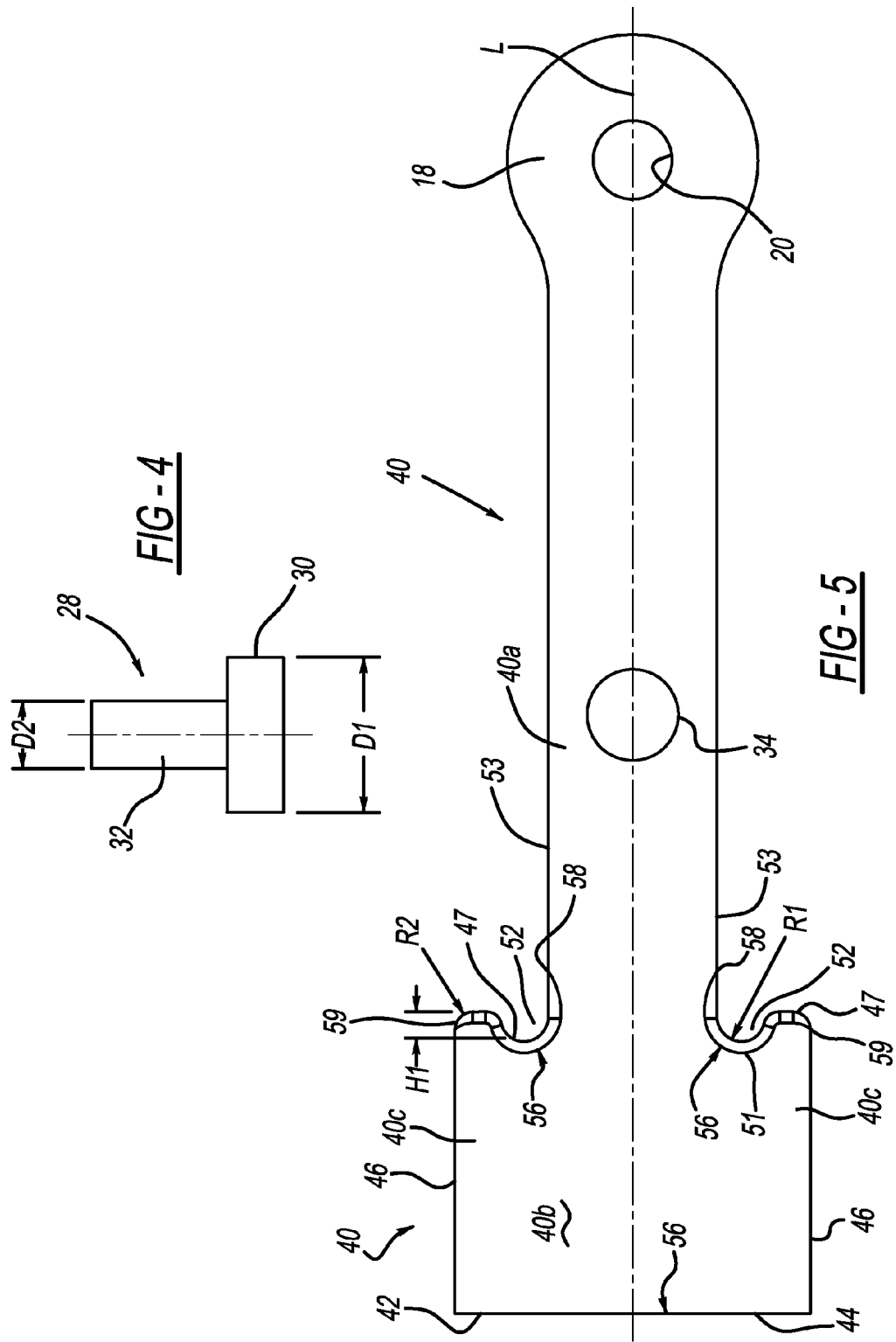

SEATBELT ANCHOR ASSEMBLY

FIELD OF THE INVENTION

This invention relates to a seatbelt anchor assembly adapted for use as part of a motor vehicle seatbelt restraint assembly.

BACKGROUND OF THE INVENTION

Seatbelt assemblies are in widespread use in motor vehicles. Present systems have certain common elements including seatbelt webbing which extends across the upper and lower torso of the occupant, and a retractor for allowing protraction and retraction of the webbing so that the belt may adapt to different sizes of occupants and be conveniently out of the way when not being used. Seatbelt assemblies further typically include a buckle which releasably attaches to a latch plate.

Seatbelt assemblies must be securely affixed to motor vehicle structural elements in order to provide the necessary restraint effect in vehicle impact conditions and further to meet government regulations. Most frequently, the buckle or other restraint system component is connected with the vehicle structure by a rigid metal strip or a cable which is mounted to the vehicle structure such as the floor pan, roof rail, body pillars, or seats using threaded fasteners. In the case of a cable anchorage a ferrule component connects the cable to the anchorage or restraint component. For some designs, it is necessary to align the ferrule generally with the intersection between the seat base cushion and the seat back for securing the lap belt and shoulder point to the buckle at that location.

In addition to aligning the ferrule with the desired location for buckling, it is also necessary to allow the ferrule to pivot in the event of a collision to align with the restraint loading forces. Prior solutions for locating the ferrule as well as meeting the dynamic requirements include the use of a steel pin riveted to the ferrule that will shear off in the event of a collision to allow the ferrule to align the loads, or a bent tab formed in the ferrule to accomplish the same functions. However, the steel pin must be made generally small to allow for the pin to shear off, and the corresponding locating hole must be made small, which can lead to manufacturing down time due to malfunctions in the hole punch. The bent tab solution requires a larger sheet metal stamping profile and additional forming of the ferrule, likewise leading to increased manufacturing costs and complexity.

The ferrules used for connecting the buckle are commonly made from sheet metal and produced using a sheet metal stamping process. After the ferrule has been stamped from the sheet metal, the ferrule must be bent to form a housing for the cable that attaches to the ferrule, where the ferrule can be subsequently crimped to secure the cable. However, bending the ferrule material can cause substantial stress to the ferrule material when the bend has a tight radius. Larger bend radiuses can reduce the stress, but results in a larger part which is undesirable due to size and weight requirements.

A seatbelt anchor assembly in accordance with this invention provides the above-mentioned features of adaptability, ease of assembly, and structural integrity.

Additional benefits and advantages of the present invention will become apparent to those skilled in the art to which the present invention relates from the subsequent description of the preferred embodiment and the appended claims, taken in conjunction with the accompanying drawings.

SUMMARY

A vehicle restraint apparatus for a motor vehicle belt restraint system and adapted for connection with a structural component of a motor vehicle is provided, the apparatus comprising: an elongate ferrule having a restraint component mounting portion, a vehicle mounting portion, and a body portion therebetween, the vehicle mounting portion having a mounting aperture therein for being pivotally mounted to a structural component of a motor vehicle; a seatbelt restraint component coupled to the restraint component mounting portion of the cable; a pin attached to the body portion of the ferrule, wherein the pin is made from a material having a lower shear strength than the material of the ferrule, and the pin is configured for being inserted into a hole or disposed against a surface of a corresponding vehicle structure to limit rotation of the ferrule about the mounting aperture in response to a load exerted on the ferrule that is below a first predetermined level, and further configured to shear off in response to a load exerted on the ferrule that is above the predetermined level to allow the ferrule to pivot about the mounting aperture.

In another form, the seatbelt restraint component is coupled to the restraint component mounting portion of the ferrule by a cable.

In another form, the ferrule is made from steel and the pin is made from aluminum.

In another form, the body portion of the ferrule includes a hole therein, and the pin is mounted within the hole.

In another form, the pin includes a first portion and a second portion, the first portion has a diameter greater than the second portion, the first portion is mounted within the hole, and the second portion is configured for being inserted into or disposed against the corresponding vehicle structure.

In another form, the pin is press-fit into the hole.

In another form, the cable comprises a pair of swaged steel ropes.

In another form, the cable is crimped within the cable mounting portion of the ferrule.

In another form, the restraint component mounting portion comprises a pair of ear portions extending outwardly from the body portion.

In another form, the body portion of the ferrule has a generally flat configuration in a pre-formed condition and defines a longitudinal axis, the body portion has a pair of longitudinal outer edges, the restraint component mounting portion is attached to the main body portion to form a single piece, the restraint component mounting portion defines a pair of ear portions extending away from the longitudinal axis, the restraint component mounting portion and body portion are generally aligned in a common plane in the pre-formed condition, the ear portions each include an outer longitudinal edge, a transitional edge extends between each of the outer longitudinal edges of the body portion and the outer longitudinal edges of the ear portions, the transitional edge has a curved section extending from the outer longitudinal edge of the body portion, and a portion of the curved section defines a recess between the ear portion and the body portion.

In another form, the seatbelt restraint component comprises a seatbelt buckle housing.

In another embodiment, a ferrule for use in a motor vehicle restraint system is provided, the ferrule comprising: a main body portion having a generally flat configuration in a pre-formed condition and defining a longitudinal axis, the main body portion having a pair of longitudinal outer edges; a head portion attached to the main body portion to form a single piece, the head portion defining a pair of ear portions extending away from the longitudinal axis, wherein the head portion and main body portion are generally aligned in a common plane, and the ear portions each include an outer longitudinal edge; and a transitional edge between each of the outer longitudinal edges of the main body portion and the outer longitudinal edges of the ear portions, wherein the transitional edge has a curved section extending from the outer longitudinal edge of the main body portion, wherein a portion of the curved section defines a recess between the ear portion and the main body portion.

In another form, the ear portions are bent inward toward the longitudinal axis when the ferrule is in a crimped condition.

In another form, the ferrule further comprises a cable mounted within the head portion when the ear portions are bent inward.

In another form, the ferrule further comprises a pin attached to the main body portion, the pin being configured for limiting rotation of the ferrule when the ferrule is mounted to a structural component of a motor vehicle.

In another form, the ferrule further comprises a lateral edge extending between the longitudinal edges of the head portion.

In another form, the ferrule is coined along a coining region.

In another form, the coining region extends along the transitional edges.

In another form, the coining region longitudinally extends from the transitional edges along a portion of the longitudinal edges of the main body portion.

In another form, the curved portion defining the recess has a radius of 2 mm.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 4 is a side view of an anti-rotation pin of the seatbelt anchor assembly;

FIG. 5 is a plan view of a ferrule blank;

DETAILED DESCRIPTION OF THE INVENTION

A seatbelt anchor assembly 10 in accordance with the first embodiment of this invention is illustrated in FIGS. 1-8. The anchor assembly 10 primarily includes a ferrule 12, cable 14, and buckle housing 16. In another form, the buckle housing 16 could be in the form of another type of seatbelt restraint component, such as a seatbelt webbing guide. It will be appreciated that references to the buckle housing 16 can also apply to other seatbelt restraint components known in the art.

Figure 1:
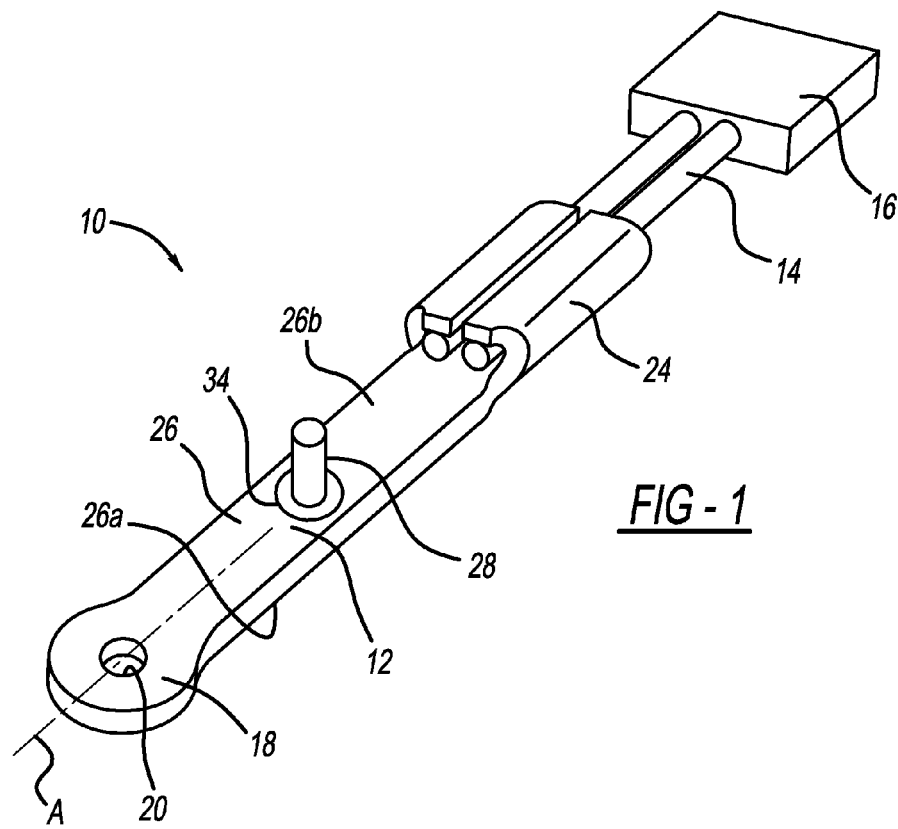
FIG. 1 is a perspective view of a seatbelt anchor assembly including a ferrule, a cable, and a seatbelt buckle.
Figure 2:
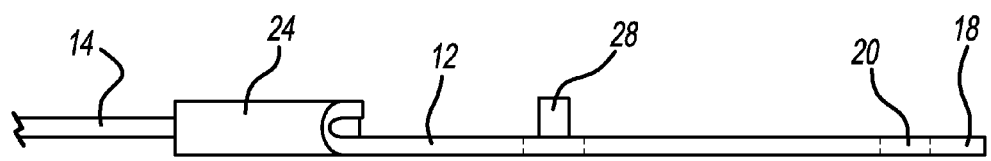
FIG. 2 is a side view of the anchor assembly.
Figure 3:
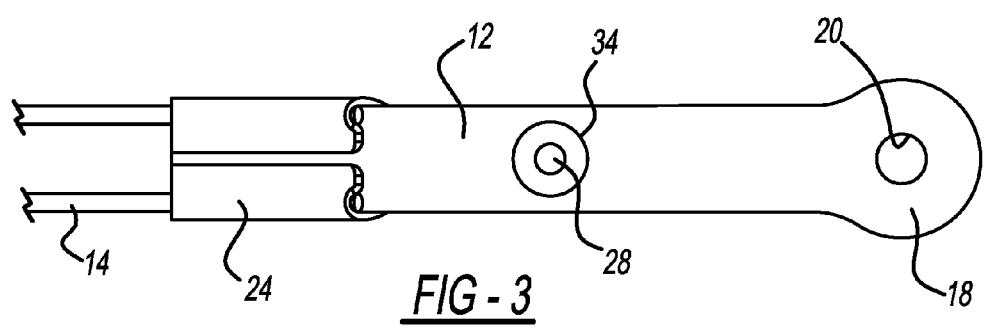
FIG. 3 is a plan view of the anchor assembly.

With reference to FIGS. 1-3, ferrule 12 is preferably formed from sheet metal stock and includes a vehicle mounting portion 18 which, in the embodiment illustrated, includes a central aperture 20 adapted to mount to a seat base 22 (FIG. 6), or other vehicle structure, such as the floor pan (not shown). The ferrule 12 further includes a seatbelt restraint component mounting portion 24 adapted for fixedly mounting the cable 14 therein, which couples the buckle housing 16 to the ferrule 12. The ferrule 12 includes a body portion 26 extending between the vehicle mounting portion 18 and the restraint component mounting portion 24. The body portion 26 can be generally flat and define an outer surface 26a that faces away from the seat base 22 when the ferrule 12 is installed, and an inner surface 26b that faces forward from the seat base 22 when the ferrule 12 is installed. The ferrule 12 defines a longitudinal axis A extending along the length of the ferrule 12.

Figure 7:
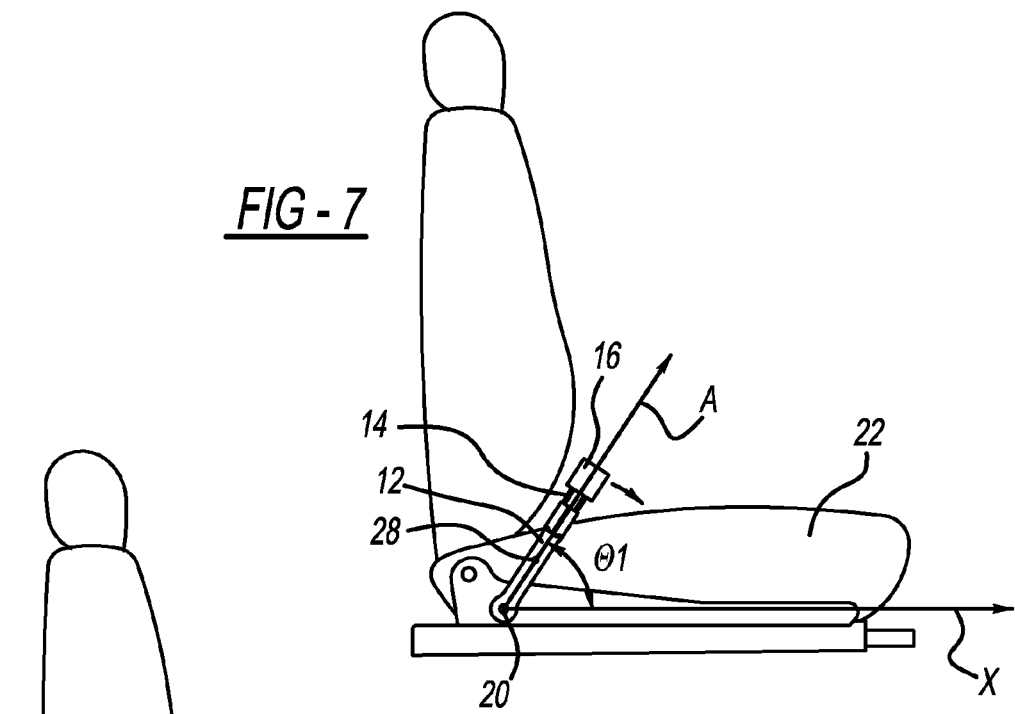
FIG. 7 is a schematic view of the anchor assembly mounted to the seat base in a first condition.

An anti-rotation pin 28 extends from the inner surface 26b generally perpendicularly thereto and toward the seat base 22 when the ferrule 12 is in the installed position (FIG. 7).

With reference to FIG. 4, the pin 28 can include a generally cylindrical ferrule portion 30 and a generally cylindrical seat portion 32 that are coaxially aligned to form the pin 28. The ferrule portion 30 can have a first diameter D1 and the seat portion 32 can have a second diameter D2. In one form, D1 is larger than D2, however D1 could also be smaller than D2, or the diameters could be the same. In one form, D2 is approximately 4.0 mm+0.2 mm/−0.1 mm and D1 has a larger diameter. The pin 28 is preferably made from Aluminum or another similar material that is softer than the material of the ferrule 12.

With reference to FIGS. 1-3, the ferrule 12 includes a hole 34 in the body portion 26 for receiving the ferrule portion 30 of the pin 28. The hole 34 can be sized to correspond to the diameter of the ferrule portion 30 to create a press-fit mounting configuration. The difference in material hardness between the pin 28 and the ferrule 12 can facilitate the pin 28 being press-fit into the hole 34. Similarly, the seat base 22 can include a hole 36 for receiving the seat portion 32 of the pin 28 (see FIG. 6). The hole 36 can be sized slightly larger than the diameter of the seat potion 32 for allowing the pin 28 to be inserted during installation of the ferrule 12 to locate the ferrule 12 relative to the seat base 22 in a reliable and efficient manner. In one form, the diameter of the hole 34 can be 4.3 mm+/−0.1 mm. Alternatively, instead of inserting the pin 28 into the hole 36, the pin 28 can be disposed against a surface of the seat base 22 or other vehicle structure to locate the ferrule 12 and limit rotation of the ferrule 12.

With reference to FIG. 5, the ferrule 12 is generally formed from steel and is stamped or cold formed. The ferrule 12 can be in the form of a blank 40 that controls how the steel is stamped to create the ferrule 12. The blank 40 includes a body portion 40a, a head portion 40b having ear portions 40c and defines a longitudinal axis L. The blank 40 includes an edge or perimeter 42 that defines the shape of the ferrule 12 after stamping. The perimeter 42 defining the head portion 40b includes lateral edge 44 and a pair of outer longitudinal edges 46 that extend from the ends of lateral edge 44. A curved edge 47 extends inward toward the longitudinal axis L and the main body portion 40a. The curved edge 47 includes a recess curve 51 that defines a recess 52 between the body portion 40a and the ear portions 40c. The recess curve 51 has radius R1, and transitions into a longitudinal edge 53 of the body portion 40a. The above description applies to both sides of the longitudinal axis L in a mirrored manner; of course, each side could be shaped differently to conform to the needs of the user. The transitions between the curved edges 47 and the outer longitudinal edges 46 of the head portion 40b can have radiuses R2. In one form, R1 can be approximately 2 mm, R2 can be approximately 1.5 mm, and the recess can have a height H1 of approximately 2.5 mm.

The shape of the blank 40 described above allows the blank 40 to be bent and crimped to mount the cable 14 therein. The ear portions 40c extend outwardly from the body portion 40a and the recess curve 51 defines the recess 52. Each of the recesses 52 are disposed generally at an area of tension that would exist in a blank having ear portions that extend straight out from the body portion 40a. In such a blank, when the ear portions are bent inwardly to crimp the cable, the intersection between the ears and the body portion would cause the material near that intersection to be pulled and stretched to be put in tension. However, the blank 40 having the shape described above and the recesses 52 in the area of tension eliminates material in that area, substantially reducing the pulling and stretching of the material and instead putting the blank 40 predominantly in compression.

Tension in the ferrule 12 after bending or crimping can weaken the connection between the ferrule 12 and the cable 14. Furthermore, the tension can lead to cracking, shearing, or lapping of the steel during forming operations. However, the blank 40 having the perimeter 42 allows the transition between the ear portions 40c and the body portion 40a to be in compression, which generally does not weaken the ferrule 12.

The ferrule 12 can undergo a coining operation to close any microcracks that may have existed prior to forming. The coining operation can be performed at region 56, which generally tracks the curved edge 47 between points 58 and 59. The region 56 is also disposed along lateral edge 44. Point 58 is disposed along longitudinal edge 53 approximately 5 mm longitudinally from the uppermost edge of the recess curve 51. Point 59 corresponds to the intersection between the curved edge 47 and longitudinal edge 46.

As described above, and with reference to FIGS. 1-3, the cable 14 is crimped within the ferrule 12 in a manner known in the art, where the ear portions 40c are bent inwardly toward the body portion 40a of the blank to define the restraint component mounting portion 24 to crimp the cable 14 therein. The cable 14 is preferably made from swaged steel wire. The cable 14 is mounted to the buckle housing 16 for use with other components of the vehicle restraint system in a manner known in the art.

Figure 6:
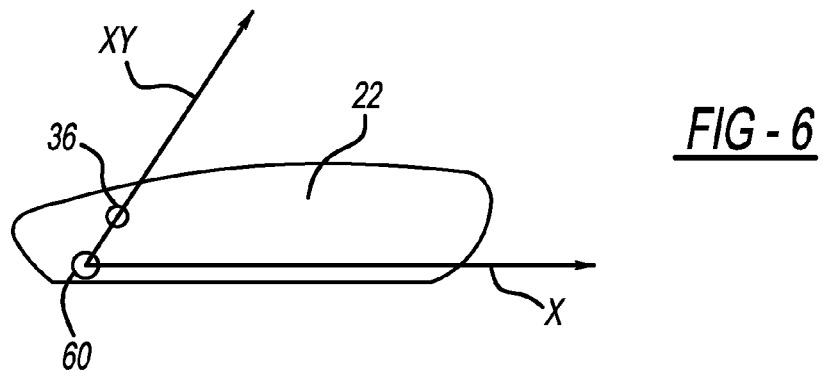
FIG. 6 is a schematic view of a seat base.
Figure 8:
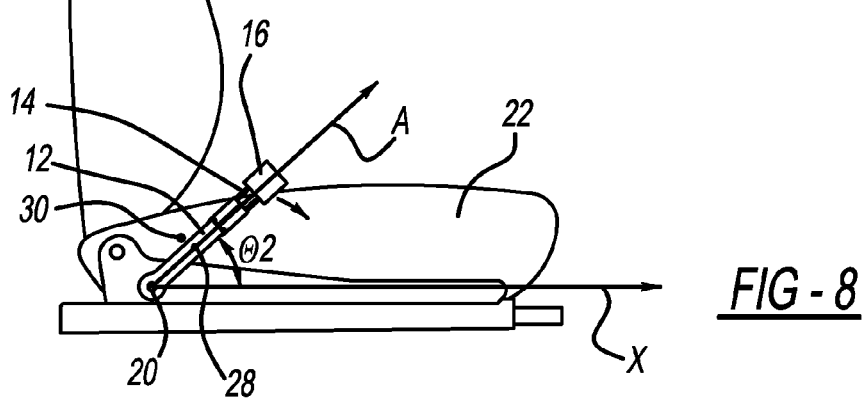
FIG. 8 is a schematic view of the anchor assembly mounted to the seat base in a second condition.

With reference to FIGS. 6-8, the ferrule 12 is mounted to the seat base 22 via the aperture 20. The pin 28 is inserted into the hole 36 in the seat base 22. The seat base 22 also includes a mounting hole 60 for mounting the ferrule 12 to the seat base 22. The seat base 22 defines a generally horizontal axis X extending forward from the center of the mounting hole 60, and an axis XY extending through the centers of the holes 36 and 60. With the pin 28 inserted into the seat base 22, the ferrule 12 can be attached to the seat base 22 using a mechanical fastener such a threaded fastener into the hole 60, a nut/bolt combination, or the like. The pin 28 can act as a locator during assembly, as well as resisting rotation of the ferrule 12 when the mounting fastener is being driven.

With the ferrule 12 installed, the axis A of ferrule 12 is generally aligned with axis XY of the seat base 22 and defines an angle Θ1 between the axes X and A. The pin 28 will resist rotation of the ferrule 12 by the occupant during normal occupant usage. In the event of dynamic loads on the vehicle, such as those seen in a crash event, the pin 28 will be caused to shear off in response to the ferrule 12 being pulled forward by the occupant load. When the pin 28 shears off, the ferrule 12 is allowed to pivot about hole 60 in the seat base 22, resulting in an angle Θ2 between axes X and A that is less than angle Θ1. The ferrule 12 is thereby allowed to align the loads of the dynamic loading in the event of a crash event.

Thus, the above described ferrule 12 provides a robust and reliable solution for manufacturing and installing the ferrule 12. The use of the aluminum pin 28 allows for a larger diameter pin and larger mounting holes (relative to a steel pin) while maintaining the desired shear strength of the pin 28. The larger mounting holes are faster and easier to manufacture, as well as providing reduced weight of the ferrule 12 due to less material used. The use of the pin 28 instead of a bent tab allows for a smaller ferrule 12 to be stamped as well as eliminating a bending operation. Moreover, the use of the recesses 52 in the blank 40 provides a stronger and more reliable restraint component mounting portion 24 of the ferrule 12 when formed.

It will be appreciated that above described concepts can be used independently of each other, if desired. For example, the pin 28 can be used on a ferrule 12 formed from a different blank. The blank 40 can be used on ferrules without the pin 28, or with a different type of pin or anti-rotation mechanism. The ferrule 12, in either case, can be used with other related vehicle restraint components and styles, and is not limited to the cable 14 and buckle housing 16 described herein.

While the above description constitutes the preferred embodiment of the present invention, it will be appreciated that the invention is susceptible to modification, variation and change without departing from the proper scope and fair meaning of the accompanying claims.

The invention claimed is:

1. A vehicle restraint apparatus for a motor vehicle belt restraint system and adapted for connection with a structural component of a motor vehicle, the apparatus comprising:
    an elongate ferrule having a restraint component mounting portion, a vehicle mounting portion, and a body portion therebetween, the vehicle mounting portion having a mounting aperture therein for being pivotally mounted to a structural component of a motor vehicle;
    a seatbelt restraint component coupled to the restraint component mounting portion of the ferrule;
    a pin attached to the body portion of the ferrule, wherein the pin is made from a material having a lower shear strength than the material of the ferrule, and the pin is configured for being inserted into a hole or disposed against a surface of a corresponding vehicle structure to limit rotation of the ferrule about the mounting aperture in response to a pivotal load exerted on the ferrule that is below a first predetermined level, and further configured to shear off in response to a pivotal load exerted on the ferrule that is above the predetermined level to allow the ferrule to pivot about the mounting aperture;
    wherein the pin includes a first portion and a second portion, the first portion has a diameter greater than the second portion, and the second portion is configured to contact a surface of the corresponding vehicle structure to oppose the pivotal load that is below the first predetermined level.

2. The apparatus of claim 1, wherein the ferrule is made from steel and the pin is made from aluminum.

3. The apparatus of claim 1, wherein the body portion of the ferrule includes a pin hole therein, and the pin is mounted within the pin hole.

4. The apparatus of claim 3, wherein the first portion is mounted within the pin hole.

5. The apparatus of claim 3, wherein the pin is press-fit into the pin hole.

6. A vehicle restraint apparatus for a motor vehicle belt restraint system and adapted for connection with a structural component of a motor vehicle, the apparatus comprising:
    an elongate ferrule having a restraint component mounting portion, a vehicle mounting portion, and a body portion therebetween, the vehicle mounting portion having a mounting aperture therein for being pivotally mounted to a structural component of a motor vehicle;
    a seatbelt restraint component coupled to the restraint component mounting portion of the ferrule;

a pin attached to the body portion of the ferrule, wherein the pin is made from a material having a lower shear strength than the material of the ferrule, and the pin is configured for being inserted into a hole or disposed against a surface of a corresponding vehicle structure to limit rotation of the ferrule about the mounting aperture in response to a load exerted on the ferrule that is below a first predetermined level, and further configured to shear off in response to a load exerted on the ferrule that is above the predetermined level to allow the ferrule to pivot about the mounting aperture;

wherein the seatbelt restraint component is coupled to the restraint component mounting portion of the ferrule by a cable.

7. The apparatus of claim 6, wherein the cable comprises a pair of swaged steel ropes.

8. The apparatus of claim 6, wherein the cable is crimped within the restraint component mounting portion of the ferrule.

9. A vehicle restraint apparatus for a motor vehicle belt restraint system and adapted for connection with a structural component of a motor vehicle, the apparatus comprising:

an elongate ferrule having a restraint component mounting portion, a vehicle mounting portion, and a body portion therebetween, the vehicle mounting portion having a mounting aperture therein for being pivotally mounted to a structural component of a motor vehicle;

a seatbelt restraint component coupled to the restraint component mounting portion of the ferrule;

a pin attached to the body portion of the ferrule, wherein the pin is made from a material having a lower shear strength than the material of the ferrule, and the pin is configured for being inserted into a hole or disposed against a surface of a corresponding vehicle structure to limit rotation of the ferrule about the mounting aperture in response to a load exerted on the ferrule that is below a first predetermined level, and further configured to shear off in response to a load exerted on the ferrule that is above the predetermined level to allow the ferrule to pivot about the mounting aperture;

wherein the restraint component mounting portion comprises a pair of ear portions extending outwardly from the body portion.

10. The apparatus of claim 9, wherein the body portion of the ferrule has a generally flat configuration in a pre-formed condition and defines a longitudinal axis, the body portion has a pair of longitudinal outer edges, the restraint component mounting portion is attached to the body portion to form a single piece, the restraint component mounting portion defines the pair of ear portions extending away from the longitudinal axis, the restraint component mounting portion and body portion are generally aligned in a common plane in the pre-formed condition, the ear portions each include an longitudinal outer edge, a transitional edge extends between each of the longitudinal outer edges of the body portion and the longitudinal outer edges of the ear portions, the transitional edge has a curved section extending from the longitudinal outer edge of the body portion, and a portion of the curved section defines a recess between the ear portion and the body portion.

11. The apparatus of claim 1, wherein the seatbelt restraint component comprises a seatbelt buckle housing.

12. A ferrule for use in a motor vehicle restraint system, the ferrule comprising:

a main body portion having a generally flat configuration in a pre-formed condition and defining a longitudinal axis, the main body portion having a pair of longitudinal outer edges;

a head portion attached to the main body portion to form a single piece, the head portion defining a pair of ear portions extending away from the longitudinal axis, wherein the head portion and main body portion are generally aligned in a common plane, and the ear portions each include a longitudinal outer edge; and a transitional edge between each of the longitudinal outer edges of the main body portion and the longitudinal outer edges of the ear portions, wherein the transitional edge has a curved section extending from the longitudinal outer edge of the main body portion, wherein a portion of the curved section defines a recess, wherein the recess is located laterally between the ear portion and the main body portion.

13. The ferrule of claim 12, wherein the ear portions are bent inward toward the longitudinal axis when the ferrule is in a crimped condition.

14. The ferrule of claim 13 further comprising a cable mounted within the head portion when the ear portions are bent inward.

15. The ferrule of claim 12 further comprising a pin attached to the main body portion, the pin being configured for limiting rotation of the ferrule when the ferrule is mounted to a structural component of a motor vehicle.

16. The ferrule of claim 12 further comprising a lateral edge extending between the longitudinal edges of the head portion.

17. The ferrule of claim 12, wherein the curved portion defining the recess has a radius of 2 mm.

18. A ferrule for use in a motor vehicle restraint system, the ferrule comprising:

a main body portion having a generally flat configuration in a pre-formed condition and defining a longitudinal axis, the main body portion having a pair of longitudinal outer edges;

a head portion attached to the main body portion to form a single piece, the head portion defining a pair of ear portions extending away from the longitudinal axis, wherein the head portion and main body portion are generally aligned in a common plane, and the ear portions each include a longitudinal outer edge; and a transitional edge between each of the longitudinal outer edges of the main body portion and the longitudinal outer edges of the ear portions, wherein the transitional edge has a curved section extending from the longitudinal outer edge of the main body portion, wherein a portion of the curved section defines a recess between the ear portion and the main body portion;

wherein the ferrule is coined along a coining region.

19. The ferrule of claim 18, wherein the coining region extends along the transitional edges.

20. The ferrule of claim 19, wherein the coining region longitudinally extends from the transitional edges along a portion of the longitudinal edges of the main body portion.

* * * * *